Patented Nov. 14, 1939

2,179,980

UNITED STATES PATENT OFFICE 2,179,980

PROCESS FOR TREATMENT OF CHLORINATED RUBBER AND PRODUCTS THEREOF

Heinrich Michaelis, Jr., Berlin-Waidmannslust, Germany, assignor to Richard M. Ritter, Frankford, Philadelphia, Pa.

No Drawing. Application April 28, 1937, Serial No. 139,462. In Germany May 23, 1936

4 Claims. (Cl. 260—735)

This invention relates to the process of treating chlorinated rubber whereby it is modified by treatment with drying or non-drying oils, plasticizers, or oil modified alkyd resins and to the many industrially valuable products obtained by incorporating the modified chlorinated rubber in solvents therefor and in various varnishes and other lacquer-type materials, with or without the addition of plasticizers, fillers, coloring agents, and the like.

Chlorinated rubber, as is well known, has extensive industrial applications, particularly in the lacquer industry in the preparation of chlorinated rubber lacquers, also in adhesives, moldable plastic masses, and other uses which need not necessarily be enumerated specifically.

When applied as a surface film, a lacquer containing the untreated chlorinated rubber exhibits certain disadvantageous characteristics, chief of these is the fact that it turns brittle and also that as time goes on it shows a pronounced change to a markedly yellowish discoloration, and the ultimate too early deterioration of the film.

On the other hand, the chlorinated rubber lacquers exhibit certain known important advantages particularly non-inflammability, fastness to alkalis, water resistance and quick drying of the lacquer film.

I have found that the prevailing disadvantages of the chlorinated rubber are modified and in a large measure entirely eliminated by modifying it in accordance with the process of my invention, which comprises modifying the chlorinated rubber by treating it, preferably by heating at relatively low temperatures, with drying or non-drying oils, plasticizers commonly employed in the lacquer industry, or an oil modified alkyd resin.

The treatment of the chlorinated rubber for the purpose of carrying out the process of my invention consists in dispersing, which includes dissolving, the chlorinated rubber, for example, in a drying oil, such as lacquer-linseed oil, polymerized linseed oil (stand oil), raw wood oil, wood oil-stand oil, or in a non-drying oil, such as castor oil, or in any of the well known plasticizers commonly employed in the lacquer industry, such as tricresylphosphate, dimethylphthalate, butylstearate, triacetine, tributylphosphate or glycerylphthalate and the like, any of which may have been previously cooked with drying or non-drying oils, or in any oil modified alkyd resin. All of the above named materials, whether drying or non-drying oil, plasticizer or plasticizer previously cooked with a drying or non-drying oil, or oil modified alkyd resin, will be broadly referred to hereinafter as treating agents.

The dispersion or dissolution of the chlorinated rubber in the treating agent is preferably carried out while heating. For example, the chlorinated rubber is slowly introduced, while stirring, into the particular treating agent selected, heat being applied and the temperature gradually being raised to between about 100 to about 200° C., depending on the particular drying or non-drying oil, plasticizer or oil modified alkyd resin employed. It is advisable to observe caution that the reaction batch does not discolorize, blacken or carbonize because of excessive application of heat. When using polymerized linseed oil (stand oil), a treatment at a temperature of about 140° C. for about two hours has been found suitable.

Any suitable proportions of the chlorinated rubber and the treating agent that will give a stable, homogeneous, non-separating combination may be employed. The proportions may also be governed by desired properties in the ultimate product and may be readily determined. A ratio of two parts of the treating agent, e. g., a drying oil, to one part of chlorinated rubber, as well as one part of a plasticizer to one part of chlorinated rubber have been used to advantage, although any proportions may be employed depending on the desired properties of the ultimate product.

The following examples illustrate the treatment of the chlorinated rubber, but the invention is not to be restricted thereby.

*Example 1*

200 grams of linseed oil stand oil are heated to about 110° C. Then 100 grams of chlorinated rubber are introduced gradually under constant stirring during a period of about thirty minutes and in which the temperature can be raised to 130° C. It is desirable that thereafter the heating be continued at the last mentioned temperature for about twenty more minutes. For the best results, it is advisable that the temperature be kept close to about 120° C. during the entire heating treatment for about fifty minutes.

*Example 2*

200 grams tricresylphosphate are heated to about 110° C. Then there are introduced therein under constant stirring 200 grams of chlorinated rubber gradually and preferably over a period of ninety minutes during which the temperature may be increased to about 130° C. Thereafter, the heating is preferably continued at the same point for about thirty additional minutes. Here also, the temperature may be maintained at around 120° C. during the entire heating treatment conducted for about one hundred and twenty minutes.

Example 3

200 grams of castor oil are heated to about 115° C. There are then added under constant stirring and gradually 100 grams of chlorinated rubber preferably over a period of about 135 minutes, during which the temperature is increased to about 135° C. and after which the temperature should be maintained at the same point for an additional thirty minutes. For most desirable results, it is advisable to maintain the temperature around 125° C. for the entire treatment carried out for about 165 minutes.

Example 4

200 grams of an oil modified alkyd resin (with drying or non-drying oils cooked glycerylphthalate, for example, Alftadat 248D/N) are heated to about 110° C. Then there are added thereto 100 grams of chlorinated rubber under constant stirring and gradually over a period of 120 minutes during which the temperature is raised to about 130° C. Thereafter the heating at that temperature is preferably continued for about another 45 minutes. Instead of the above described heating schedule, it is advisable to maintain the temperature at around 125° C. during the entire treatment carried on for about 165 minutes.

While the use of only a single different treating agent has been shown in each of the examples, it is emphasized that any of the various treating agents can also be used in combination with any of the others, for example, linseed oil stand oil used along with tricresylphosphate or tricresylphosphate together with on oil modified alkyd resin, or any other combination of at least any two of the different possible treating agents. Thus, it is possible to combine, for example, 100 grams of linseed oil stand oil with 100 grams of tricresylphosphate, in accordance with any of the treatments described, with 100 grams of chlorinated rubber.

The viscous masses of modified chlorinated rubber obtained according to the process as thus far described and illustrated in the examples may be used for many practical applications, generally diluted in a suitable manner. For example, the viscous mass can be made into a solution with any of the usual straight solvents for chlorinated rubber, such as the benzene hydrocarbons, for example, benzene, toluene, and xylene, or with solvent mixtures of the type which are generally known in the lacquer industry and which contain in addition to the specific solvents for chlorinated rubber, diluents such as alcohols (e. g. ethyl, butyl, amyl alcohols). The solvent, straight or mixed, to be selected naturally depends upon the purpose of the specific application for which the chlorinated rubber modified according to my invention is to be used.

The chlorinated rubber modified in accordance with my invention, especially when it had been treated with tricresylphosphate, in addition to being soluble in the usual solvents for chlorinated rubber, can also be dissolved in other solvents, such as oil of turpentine (German) or substitutes therefor (Sangajol) with an addition of as little as about 10% of a specific solvent for chlorinated rubber, such as the benzene hydrocarbons. Such solution is not possible with the chlorinated rubber which is not so processed.

Thus, chlorinated rubber modified according to my invention is applicable as a good lacquer base for such solutions of it of the type hereinabove described serve as valuable lacquers to which can be added, if necessary, the usual plasticizers, resins, fillers, coloring agents and the like.

It should be noted that the chlorinated rubber treated by the heat-process of my invention need not be dissolved in accordance with the above methods of solution as needed, but can even be homogenized at the end of the heating of the treating process, or while cooling down therefrom, by adding thereto while stirring a straight solvent such as toluol or other benzene hydrocarbon. In this manner, the heat processed modified product is sooner obtained in any required consistency and any desired dilution.

The chlorinated rubber treated according to my process, for example, the tricresylphosphate combination product, has proven itself especially valuable, as compared with the non-treated chlorinated rubber, in that it is soluble not only in linseed oil varnishes or oil lacquers and the like, but also in varnish substitutes such as train oil varnish, resin varnish or thinned linseed oil varnishes.

If the chlorinated rubber is dissolved in pure linseed oil varnish, the linseed oil varnish is so much improved that the common undesirable appearances ordinarily encountered on aging in the untreated linseed oil varnish are entirely eliminated or very considerably delayed.

An addition of about 10% of chlorinated rubber modified according to my invention to a train oil varnish eliminates its usual stickiness after drying and the drying with a high gloss.

Resin varnish to which has been added about 10% of the chlorinated rubber modified according to my invention shows marked advantages over the untreated resin varnish in a considerably improved resistance to water and to atmospheric conditions as well as in a greatly increased elasticity.

It may be generally stated that varnish substitutes used in conjunction with, i. e., to which have been added, chlorinated rubber modified according to my invention yield products exhibiting properties approaching those of linseed oil varnish.

Chlorinated rubber modified according to my invention has also proven valuable as an addition agent in the production of gold printing pastes. Compared to gold printing pastes heretofore available, gold printing pastes containing my modified chlorinated rubber give a surface which dries with a high gloss and the pastes separate freely from the printing plate.

The chlorinated rubber modified according to the process of my invention is specially valuable in combination with nitro-cellulose. Reference has been made in the early paragraphs of this specification to the extensive uses of chlorinated rubber and to certain of its inherent advantageous and disadvantageous characteristics.

It is similarly well-known that nitro-cellulose has extensive industrial applications, particularly in the lacquer industry for nitro-cellulose lacquers, and in the film industry for films for stationary and motion pictures, and also in the form of celluloid sheets for the production of combs and other salable articles.

Likewise, the nitro-cellulose lacquers as well as composite materials containing chiefly nitro-cellulose as their base, such as Celluloid, possess disadvantageous properties, particularly great combustibility and inflammability. Moreover, the lacquer films thereof, as all other nitro-cellulose compositions, become quite brittle on exposure to atmospheric conditions. Nevertheless, in spite of these disadvantages, nitro-cellulose lacquers, as well as the composite materials containing nitro-cellulose as a base, find far reaching industrial application, particularly because these lacquers are especially quick drying and conducive of considerable labor saving, as compared with the usual oil lacquers. Generally, economic considerations are the deciding factor in determining the adoption of nitro-cellulose as a base for lacquers, films, and the like.

Thus it is seen that both chlorinated rubber as well as nitro-cellulose as base substances for lacquers and the like show considerable disadvantages in some respects, and marked advantages in many other ways.

Attempts to overcome the disadvantages of either of these base materials by combining it with the other are unsuccessful because a satisfactorily homogeneous solution containing chlorinated rubber along with nitro-cellulose cannot be produced. Thus, if a solution of chlorinated rubber is mixed with a nitro-cellulose solution, a separation of both base substances takes place within a very short time, chorinated rubber being precipitated from the mixture.

I have found that the difficulties of combining chlorinated rubber and nitro-cellulose are overcome by employing the chlorinated rubber modified by the process of my invention as hereinabove described, with the result that the subsequent mixture of the thus modified chlorinated rubber and the nitro-cellulose is a homogeneous, stable, non-separating composite product of the combined modified chlorinated rubber and nitro-cellulose. In this product, the inherent disadvantageous properties of the untreated chlorinated rubber and the nitro-cellulose are so completely modified as to be substantially entirely eliminated.

The combining of the modified chlorinated rubber is achieved by effecting the dissolution of the viscous modified chlorinated rubber mass in one of the commonly used solvents or solvent mixtures for chlorinated rubber and nitro-cellulose respectively, such as ethyl, butyl, or amyl acetate or other esters of acetic acid together with the common diluents, such as the benzene hydrocarbons, and the alcohols, such as methyl, ethyl, butyl alcohol, etc. The chlorinated rubber is combined with the nitro-cellulose solution, the latter being made up in the usual way, preferably with the same solvents as employed with the chlorinated rubber, and its viscosity being selected in accordance with the ultimate purpose of the application. It is evident that modified chlorinated rubber obtained in accordance with the process of my invention, without being previously dissolved in solvents itself, can also be added directly preferably gradually to the nitro-cellulose solution of the type just hereinabove referred to.

It should be mentioned that the nitro-cellulose solution can also be made up in the known manner practised in the industry from film or other suitable scrap. A perfectly homogenous, stable, non-separating chlorinated rubber-nitro-cellulose lacquer is obtained, to which can or should be added the commonly used plasticizers, coloring agents, fillers, and the like, so well known to the art that their specific enumeration here is unnecessary.

It should be expressly noted that the chlorinated rubber modified by my process can be combined with the nitro-cellulose in any proportion the practice demands, so that there is the widest latitude for adapting the resulting modified chlorinated rubber-nitro-cellulose composite product to the varying demands and many-fold requirements of the industry.

From the thus combined nitro-cellulose and modified chlorinated rubber, a lacquer film is obtained which adheres to any surface more strongly than the film from ordinary lacquer that contains only one of these two lacquer base materials, or both, but in which the chlorinated rubber has not been modified as herein described.

Furthermore, by the above described combination of the modified chlorinated rubber and nitro-cellulose a very transparent, glass clear and glossy or lustrous film is obtained as compared with the film obtained from the untreated chlorinated rubber lacquer, which latter inherently possesses a pronounced yellow color. The resistance to weather conditions and to water of the lacquer is very considerably improved by employing the composite of the two base materials with the chlorinated rubber modified as shown. The commonly encountered yellowing of the clear lacquers is avoided by employing the described combination.

The described combination of the two base materials yields a finished film which is wholly non-inflammable or ignites only with great difficulty depending on the percentage of the modified chlorinated rubber present.

In employing the two base materials, modified chlorinated rubber and nitro-cellulose, in a ratio of twenty to eighty (20:80), figured as solids, a film is obtained which ignites only with great difficulty, whereas when using equal porportions (1:1), the resulting film is practically entirely non-inflammable. These films in respect to (non)-inflammability show similar properties to cellulose acetate film.

Attention is called to the fact that in certain cases the difficult inflammability is not only exhibited by the dry film, but is also evidenced even in the case of the still liquid lacquers. This is especially manifest when glycerylphthalate (which has been cooked with drying or non-drying oils) is used as the treating agent for the chlorinated rubber.

The above described advantages of the new combination composite base product are in evidence to the same degree in the manufacture of brushing or coating lacquers as well as in the production of self-sustaining film rolls spun fibres, or the like. Thus, for example, a film for photographic purposes prepared from the new combination composite product exhibits the same difficult inflammability as the cellulose acetate film without having the latter's disadvantages of being difficult to work, pronounced brittleness, and easy loss of shape.

In like manner, the described advantages are inherently in evidence in the plastic masses or bodies, such as Celluloid sheets and articles manufactured therefrom.

It is particularly emphasized that wherever nitrocellulose has been referred to herein, any other cellulose esters, such as cellulose acetate, which by virtue of their property may be considered equivalents of nitro-cellulose, may be substituted.

While certain specific embodiments of my invention have been more particularly described hereinabove, it is understood that certain modifications, substitutions and changes may be made therein without departing from the spirit of the invention which shall be limited in scope only by the appending claims as interpreted by the prior art.

I claim:

1. The process of preparing a homogeneous, stable and non-separating composite product of chlorinated rubber and a cellulose ester which comprises heating the chlorinated rubber to a temperature above 100° C. for a prolonged time with a treating agent consisting of at least one member of the group consisting of drying oils, non-drying oils, plasticizers and oil modified alkyd resins for a sufficient time to effect sufficient modification thereof, then dissolving the modified chlorinated rubber in one portion of a mutual solvent therefor and for the cellulose ester, then dissolving the cellulose ester in another portion of the mutual solvent and then blending the two solutions.

2. The process of preparing a homogeneous, stable and non-separating composite product of chlorinated rubber and a cellulose ester which comprises heating the chlorinated rubber to a temperature above 100° C. for a prolonged time with a treating agent consisting of at least one member of the group consisting of drying oils, non-drying oils, plasticizers, and oil modified alkyd resins, dissolving the cellulose ester in a mutual solvent therefor and for the modified chlorinated rubber, and then gradually introducing the modified chlorinated rubber into the solution of the cellulose ester in the mutual solvent.

3. The process of preparing a homogeneous, stable and non-separating composite product of chlorinated rubber and a cellulose ester which comprises heating the chlorinated rubber to a temperature above 100° C. for a prolonged time with a drying oil to effect substantial modification thereof, then dissolving the modified chlorinated rubber in one portion of a mutual solvent therefor and for the cellulose ester, then dissolving the cellulose ester in another portion of the mutual solvent and blending the two solutions.

4. A composition of matter comprising a homogeneous, stable, non-separating dispersion of nitrocellulose and chlorinated rubber substantially identical with the product made in accordance with the process set forth in claim 1.

HEINRICH MICHAELIS, Jr.